(12) United States Patent
Eriksson et al.

(10) Patent No.: US 7,407,204 B2
(45) Date of Patent: Aug. 5, 2008

(54) ARRANGEMENT FOR A VEHICLE SIDE FAIRING, AND A VEHICLE COMPRISING SUCH A SIDE FAIRING

(75) Inventors: Anders Eriksson, Göteborg (SE); Jens Gustafsson, Göteborg (SE); Hans Regnell, Ytterby (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/563,602

(22) Filed: Nov. 27, 2006

(65) Prior Publication Data

US 2007/0085355 A1    Apr. 19, 2007

Related U.S. Application Data

(63) Continuation of application No. PCT/SE2005/000810, filed on May 27, 2005.

(30) Foreign Application Priority Data

May 27, 2004   (SE)   .................................... 0401391

(51) Int. Cl.
*B60R 19/02* (2006.01)
(52) U.S. Cl. ...................... 293/102; 293/118
(58) Field of Classification Search ................ 293/102, 293/118, 132
See application file for complete search history.

(56) References Cited

U.S. PATENT DOCUMENTS

| | | | | |
|---|---|---|---|---|
| 564,027 A | * | 7/1896 | Pratt | 293/128 |
| 824,541 A | * | 6/1906 | Hager et al. | 293/118 |
| 1,127,241 A | * | 2/1915 | Hawksworth | 293/128 |
| 1,252,558 A | * | 1/1918 | Edrington | 293/118 |
| 1,511,085 A | * | 10/1924 | McIntyre | 293/128 |
| 4,688,824 A | * | 8/1987 | Herring | 293/118 |
| 4,877,266 A | * | 10/1989 | Lamparter et al. | 293/118 |
| D352,019 S | * | 11/1994 | Rivero et al. | D12/169 |
| 7,077,440 B1 | * | 7/2006 | Morales et al. | 293/128 |
| 7,188,875 B2 | * | 3/2007 | Norelius | 293/118 |

FOREIGN PATENT DOCUMENTS

| | | |
|---|---|---|
| DE | 4017160 A1 | 12/1991 |
| DE | 9115125 U1 | 5/1992 |
| DE | 4112372 A1 | 7/1992 |
| DE | 4142804 A1 | 8/1992 |
| GB | 2172556 A | 9/1986 |

* cited by examiner

*Primary Examiner*—Kiran B. Patel
(74) *Attorney, Agent, or Firm*—Novak Druce + Quigg LLP

(57) ABSTRACT

A vehicle side underrun protection having at least one load-bearing member that extends between the wheels or sets of wheels of the vehicle in the vehicle's longitudinal direction. The member(s) extend basically along the outer contour of the vehicle and serves as side impact protection and/or protection to prevent unprotected road-users ending up under the vehicle. The side underrun protection (1) has at least one longitudinal section (12, 13, 14) suspended in at least two first brackets (2, 3) fixed to the vehicle, along which brackets (2, 3) at least one end of each individual section (12, 13, 14) of the side underrun protection (1) is vertically adjustable from at least a first, active position to a second, inactive position. The invention also relates to a vehicle provided with such a side underrun protection.

9 Claims, 6 Drawing Sheets

ARRANGEMENT FOR A VEHICLE SIDE FAIRING, AND A VEHICLE COMPRISING SUCH A SIDE FAIRING

CROSS-REFERENCE TO RELATED APPLICATIONS

The present application is a continuation patent application of International Application No. PCT/SE2005/000810 filed 27 May 2005 which is published in English pursuant to Article 21(2) of the Patent Cooperation Treaty and which claims priority to Swedish Application No. 0401391-8 filed 27 May 2004. Said applications are expressly incorporated herein by reference in their entirety.

FIELD

The present invention relates to an arrangement for a side underrun protection for vehicles, such as trucks and the like, and comprising at least one load-bearing member, which extends between the wheels or sets of wheels of the vehicle in the longitudinal direction thereof and basically along the outer contour of the vehicle, and which serves as side impact protection and/or protection to prevent unprotected road-users, such as pedestrians, cyclists and motor cyclists, ending up under the sides of the vehicle and becoming trapped under the vehicle.

BACKGROUND

Nowadays it is not all that uncommon for unprotected road-users to end up between the wheels or sets of wheels of a heavier vehicle or right under the vehicle, causing not only severe damage to the vehicle they are traveling on but also serious injury to the road-users themselves.

There are now various types of side underrun protections on the market designed to prevent or reduce the injurious effects of such collisions. However, these hitherto known side underrun protections have various disadvantages. Among other things they are difficult to remove when a driver of a heavy vehicle, in the event of a puncture, for example, has to release a spare wheel which is situated behind the side underrun protection, for example, or if the side underrun protection for other reasons has to be removed or adjusted for better access under the vehicle. According to some known solutions a number of pins and/or bolts have to be removed in order to be able to release the side underrun protection and these fixing arrangements are often difficult to manipulate due, among other things, to the dirt etc. which is always deposited on the chassis of the vehicles and also on the actual side underrun protections.

Current side underrun protection is generally also fixedly mounted and does not allow the entire side underrun protection or parts thereof to be readily adjusted in any way. This may be relevant if the vehicle has to be maneuvered on uneven ground, for example on minor forest roads or on a construction site. Since a side underrun protection may be fitted relatively low down, at a height corresponding to the front of an automobile, there is a risk of it catching on the ground if there are hollows and bumps, resulting in damage to the side underrun protection.

There may also be a need to be able to adjust an upper section vertically, for example on a vehicle with interchangeable bodies, in order to make the distance between the side underrun protection and the interchangeable body conform to any statutory requirements.

The object of the present invention is to eliminate these known problems and provide a side underrun protection comprising at least one individually adjustable section, which through very simple operations can be vertically and/or longitudinally adjusted on the brackets supporting it on the vehicle in question.

SUMMARY

According to one embodiment, the invention takes the form of an arrangement for a vehicle side underrun protection that comprises at least one load-bearing member, which extends between the wheels or sets of wheels of the vehicle in the longitudinal direction thereof and basically along the outer contour of the vehicle, and which serves as side impact protection and/or protection to prevent unprotected road-users ending up under the vehicle. The side underrun protection comprises at least one longitudinal section suspended in at least two first brackets fixed to the vehicle, along which brackets at least one end of each individual section of the side underrun protection is vertically adjustable from at least a first, active position to a second, inactive position.

This embodiment therefore allows one or more sections of a side underrun protection to be moved vertically between different positions, which may be both active and inactive positions. The section or sections can also be raised and lowered, and locked, in a vertical direction, both ends being adjusted to the same level or to different levels. Each section can thereby be locked in at least one basically horizontal position, parallel to the underlying surface or the vehicle frame, for example, or alternatively in an angled position. The purpose of such an adjustment, for example, may be to improve access to a component fitted to the vehicle frame, to adjust the side underrun protection to different load conditions, for example when switching between different types of interchangeable body, or to reinforce the side underrun protection at a predefined height under certain conditions.

According to a further embodiment the side underrun protection may therefore comprise at least one section which is vertically adjustable from at least a first active position to a second active position, vertically separate from said first position. These active positions may constitute two or more fixed positions or may consist of continuously adjustable positions between a highest position and a lowest position.

According to a further embodiment the side underrun protection may comprise at least two sections which are individually vertically adjustable from at least a first active position to a second inactive position. According to an alternative embodiment said sections may also be individually vertically adjustable from at least a first active position to a second active position.

The aforementioned embodiments may also comprise an upper, fixedly mounted section supplemented by one or more moveable sections, or vice versa. This permits a very flexible solution in which one, two or more sections can be rapidly set to different heights, depending on the relevant driving conditions or on the current sphere of use of the vehicle.

According to a further embodiment at least a first section can be moveably fastened to said first brackets adjacent to their front or rear ends. That is to say the sections can be fastened to the brackets directly adjacent to their ends, or a short distance from said ends. This example allows for one or more moveable and/or one or more fixed sections. Alternatively, each individual section can be moveably fastened to said first brackets adjacent to its front and rear ends. According to a further embodiment a second section can be moveably fastened to a first section adjacent to their front and rear ends. Alternatively, a first section can be moveably fastened to a second section by means of a pair of vertical guides fixed to the first section. In the latter case the second section can preferably be fixed to said guides, which are in turn mounted alongside said first bracket between the first brackets.

According to a further embodiment the side underrun protection may comprise at least one section which is horizontally adjustable in relation to at least its first active position. This allows one or more sections to be displaced in the longitudinal direction of the vehicle, which can afford greater access to components situated behind the side underrun protection. This arrangement requires the sections to be fixed to brackets at a distance from their ends, or alternatively requires the use of at least three brackets.

According to a further embodiment two or more side underrun protections may be fitted in series along the sides of the vehicle. This means that each side underrun protection can be individually adjusted according to any form of superstructure that might be fitted to the vehicle, in that the arrangement permits raising/lowering and angling in any direction over the entire length of the vehicle or parts thereof.

The aforementioned first brackets are preferably, but not necessarily, fixed to a longitudinal member in the vehicle. This type of side underrun protection is primarily used for frame-built vehicles, such as trucks, trailers and various types of towed vehicles. The brackets naturally have to be adjusted in order to be able to absorb impact and lateral forces regardless of the placing of each section. Both the longitudinal sections and their brackets may therefore comprise suitable deformable components for absorbing such forces.

The invention also relates to a vehicle comprising a side underrun protection according to the description above.

The invention has provided a side underrun protection which flexibly fulfills its purposes. The side underrun protection according to the invention is also of very simple design. The side underrun protection can be fixed in position via the brackets by means of a single bolt or pin, for example, which permits adjustment through very simple operations. The locking arrangements can also be spring-loaded towards the locked position, so that a bolt or catch automatically engages with an interacting surface when the side underrun protection or a part of this is placed in a desired position. Finally, the brackets are designed with few items of material, which means that the side underrun protection as a whole comprises a small number of parts and is therefore very inexpensive to manufacture.

BRIEF DESCRIPTION OF THE DRAWINGS

The invention will be described in more detail below with the aid of a preferred exemplary embodiment and with reference to the drawings attached, in which.

DETAILED DESCRIPTION

Figure 1:
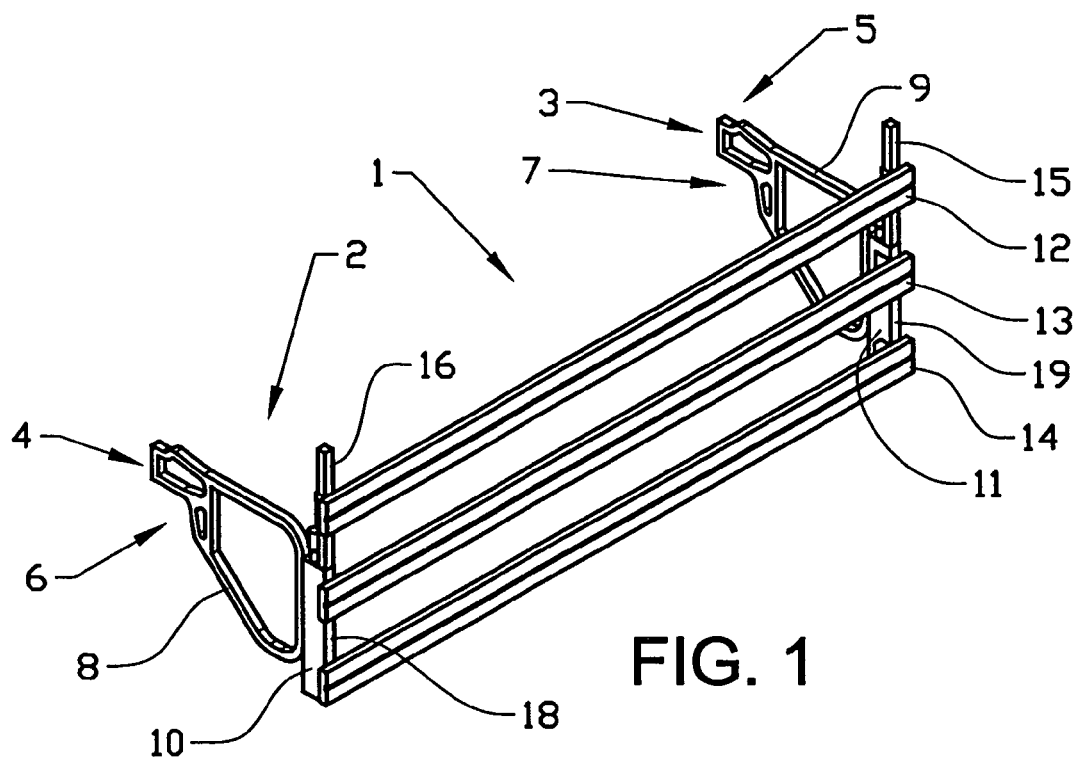
FIG. 1 shows a perspective view of a first embodiment of a side underrun protection according to the invention, with all sections in their active positions.

FIG. 1 shows a side underrun protection according to a first embodiment of the invention. This side underrun protection 1 comprises a first bracket 2 and second bracket 3 for fitting the side underrun protection to a suitable part of a vehicle, such as a longitudinal member. Each bracket 2, 3 comprises a fixing part 4, 5, a deformable section 6, 7 and a frame part 8, 9 with a holder 10, 11 for adjustable sections of the side underrun protection. The fixing part 4, 5 is provided with fasteners for fitting the bracket to the vehicle, the fasteners (not shown) preferably consisting of bolts and/or holes for fitting bolts. The deformable section 6, 7 constitutes a part of the force-absorbing structure of the side underrun protection, force being absorbed by controlled deformation relative to the vehicle when an object strikes the side underrun protection. The frame part 8, 9, which may also be deformed in the event of a side impact, comprises a tubular construction in the form of a bent square tubing. The tubular construction of the frame part 8, 9 is joined to the deformable section 6, 7 in order to form a closed profile. The dimensions of the tubular construction can be adapted to the vehicle in question, so that a desired number of longitudinal sections can be fitted basically parallel to an outer part of adjacent vehicle wheels and/or chassis.

Figure 2:
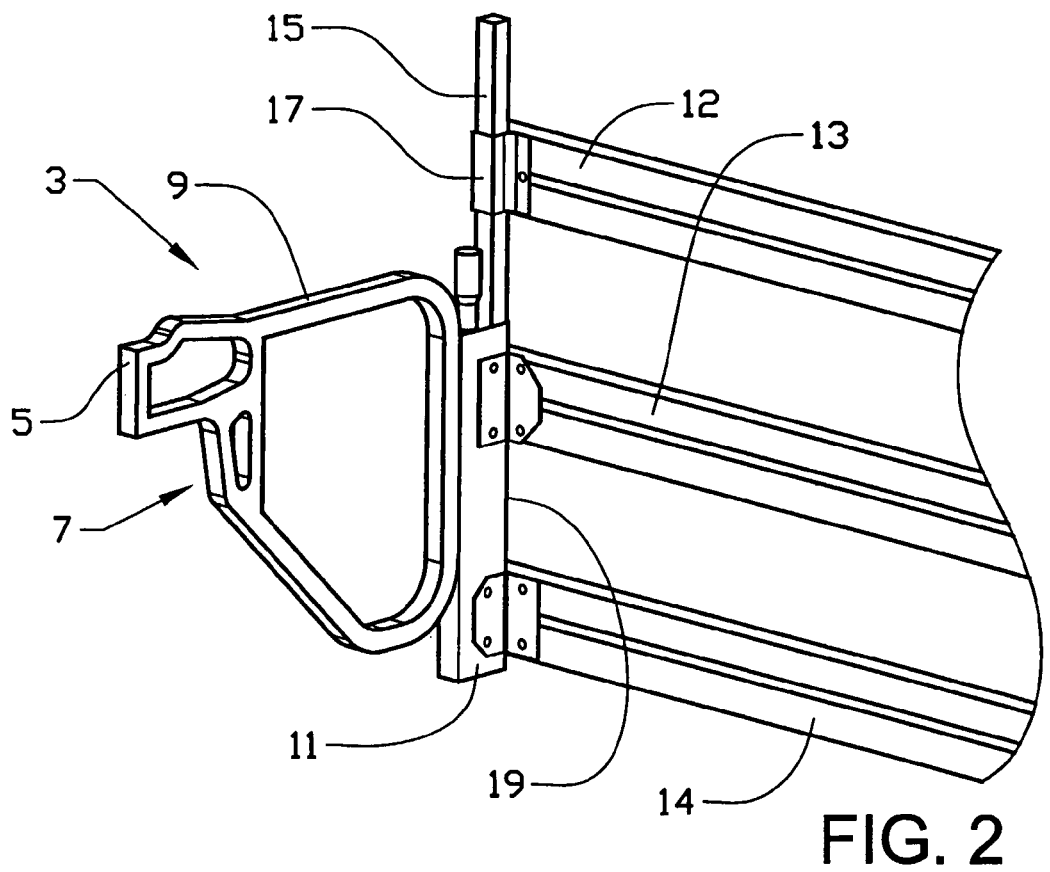
FIG. 2 shows a detailed view of the side underrun protection shown in FIG. 1.

In this embodiment the bracket comprises a holder 10, 11 for three longitudinal, adjustable sections 12, 13, 14. The holder 11, as can be seen from FIG. 2, is detachably mounted on the frame part 9 and has basically the same vertical extent as the latter. An upper, first longitudinal section 12 is adjustably mounted on a basically vertical, first guide 15, which permits vertical adjustment of said section relative to the holder 11 and a middle, second longitudinal section 13. The guide 15 in this case consists of a square profile, the first longitudinal section 12 being provided with an attachment 17 in the form of a square profile which encloses the guide 15. The first guide 15 is fixedly-mounted on a basically vertical, second guide 19, which is in turn adjustably mounted on the holder 11. The second and a third longitudinal section 13, 14 are fixedly mounted on the second guide 19. According to this embodiment all longitudinal sections 12, 13, 14 are mounted on respective guides 15, 16 on the outer part of their front and rear ends (see FIG. 1).

The upper longitudinal section 12 and the second guides 18, 19 are provided with locking members in the form of spring-loaded bolts (not shown), which by a simple operation can be released against a spring force in order to permit adjustment of each longitudinal section or guide.

Figure 3:
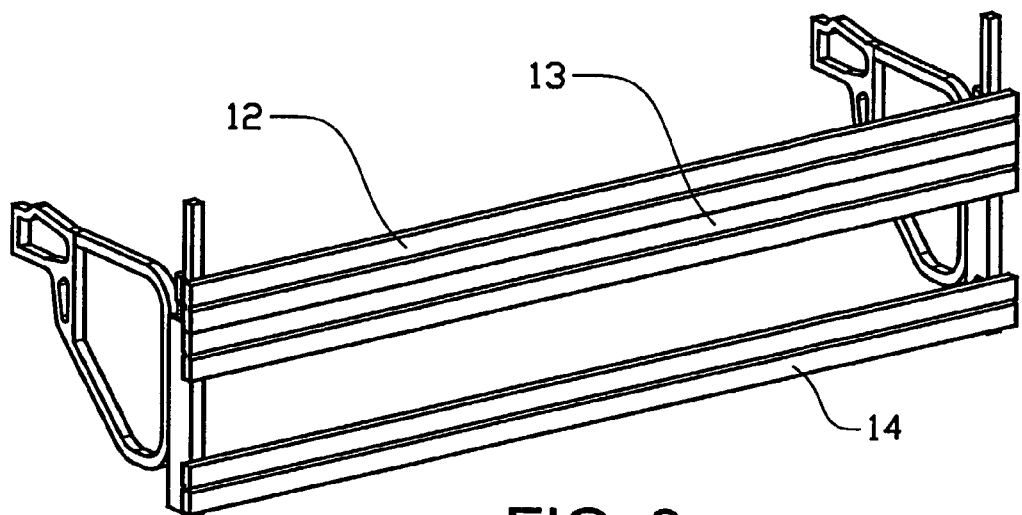
FIG. 3 shows a perspective view of the side underrun protection according to FIG. 1, in which a section has been adjusted in a vertical direction.
Figure 4:
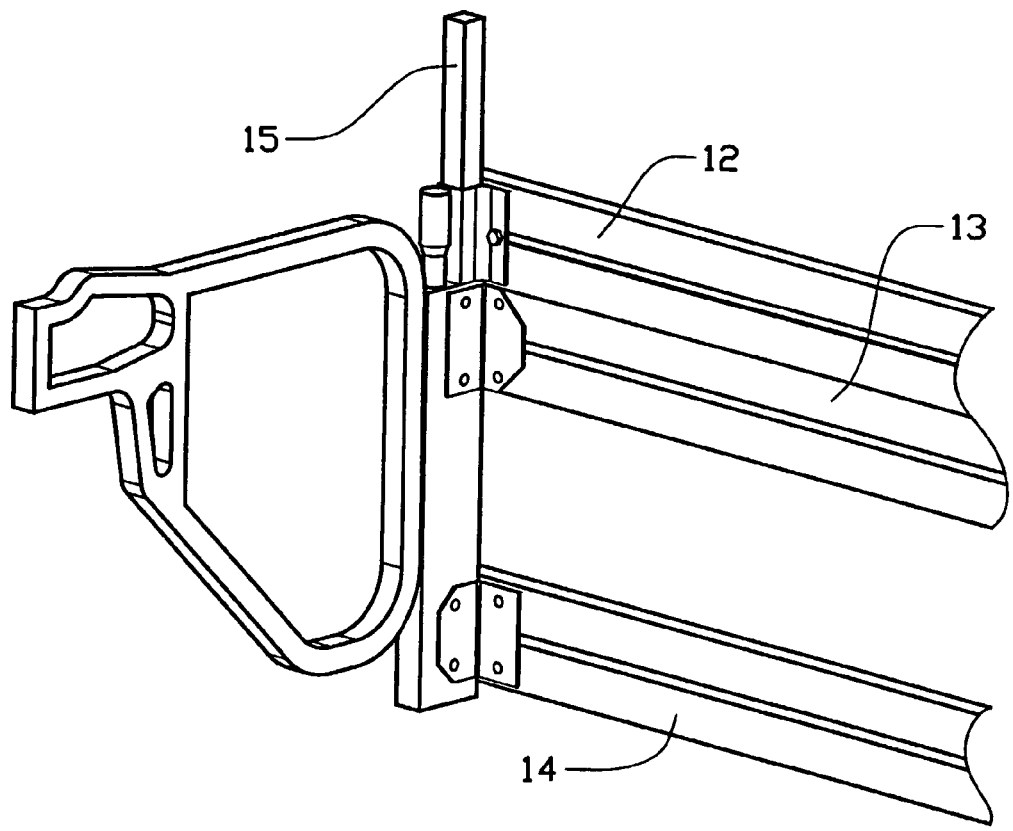
FIG. 4 shows a detailed view of the side underrun protection shown in FIG. 3.

FIGS. 3 and 4 show a side underrun protection according to FIGS. 1 and 2 respectively, in which the upper, first longitudinal section 12 has been adjusted downwards in a vertical direction to rest against the middle, second section 13. The purpose of such an adjustment, for example, may be to improve access to a component fitted to the vehicle frame, to adjust the side underrun protection to modified load conditions or to reinforce the side underrun protection at a predefined height under certain conditions.

It is naturally also possible to have all longitudinal sections mounted on guides that are adjustably fastened to each holder. In this way all longitudinal sections can be vertically adjusted simultaneously, or individually, depending on the purpose of the adjustment.

Figure 5:
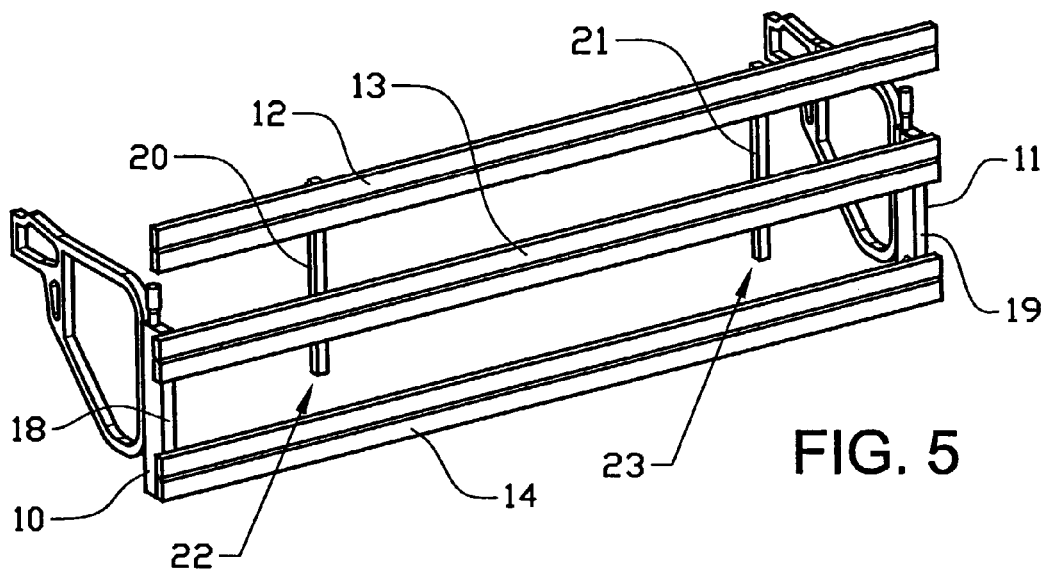
FIG. 5 shows a perspective view of a second embodiment of a side underrun protection according to the invention, with all sections in their active positions.

FIG. 5 shows an alternative, second embodiment of the side underrun protection according to the invention. As can be seen from the figure, this embodiment has a pair of brackets for fastening the side underrun protection, corresponding to those described in connection with FIG. 1 above. In addition to this a second and a third longitudinal section 13, 14 are fitted at their outer ends to the second guides 18, 19, these guides in turn being adjustably fastened to the holders 10, 11.

The embodiment according to FIG. 5 differs from that described in FIG. 1 in that the first guides 15, 16 are not mounted on the second guides 18, 19 fixed to each of the holders 10, 11 respectively. According to this embodiment the upper, first longitudinal section 12 is provided with a pair of modified first guides 20, 21 in the form of square profiles, which are fixed to said section in positions separated from the outer, front and rear ends of the section. As can be seen from FIG. 6, the middle, second longitudinal section 13 is here provided with an attachment 22 connected to each first guide 20. The guide 20 passes through the attachment 22 and can be locked in at least two vertically separated positions in relation to the latter.

The guides 20, 21 of the upper longitudinal section 12 therefore interact with their corresponding attachments 22, 23, which are provided with locking members in the form of spring-loaded bolts (not shown), which by a simple operation can be released against a spring force in order to permit adjustment of the longitudinal section 12. The second and third longitudinal sections 13, 14 are likewise adjustable, as described in connection with FIG. 1 to 4 above.

Figure 6:
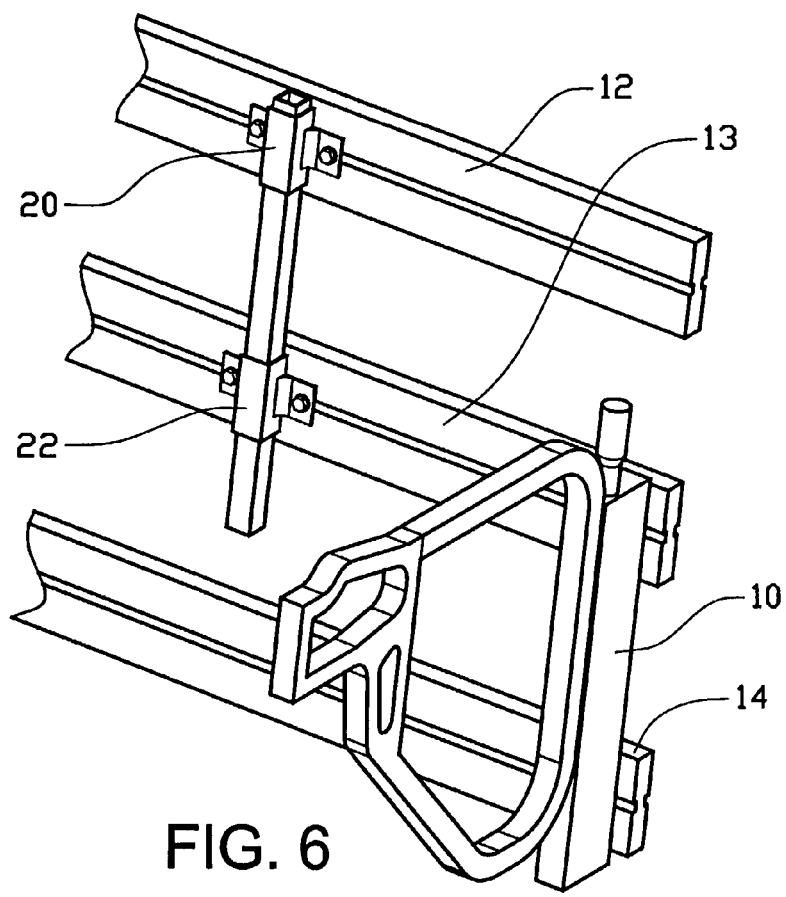
FIG. 6 shows a detailed view of the side underrun protection shown in FIG. 5.
Figure 7:
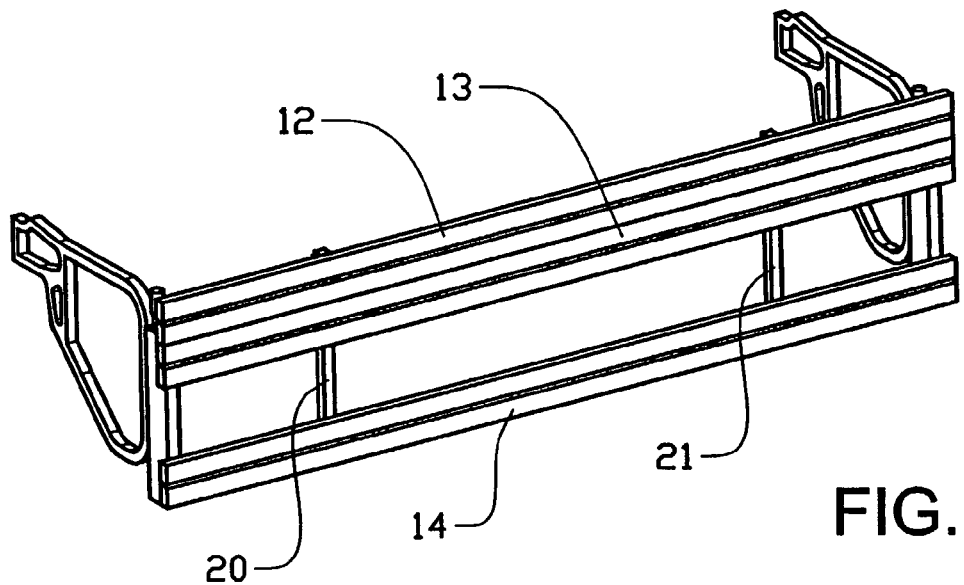
FIG. 7 shows the side underrun protection according to FIG. 5, in which a section has been adjusted in a vertical direction.
Figure 8:
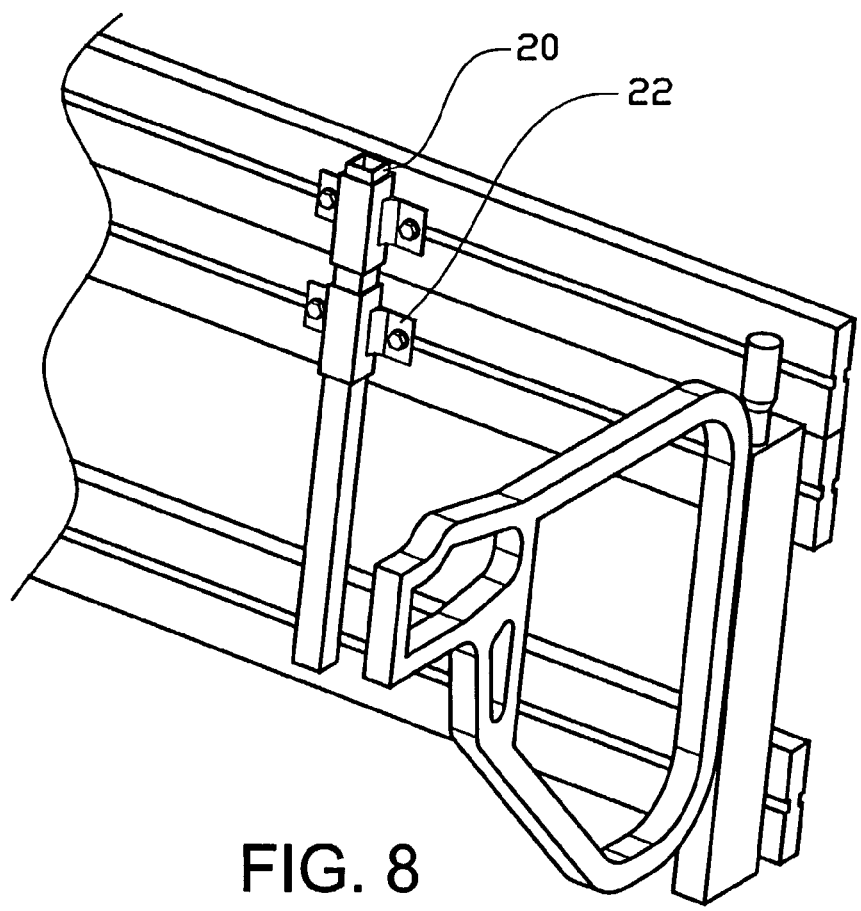
FIG. 8 shows a detailed view of the side underrun protection shown in FIG. 7.

FIGS. 7 and 8 show a side underrun protection according to FIGS. 5 and 6 respectively, in which the upper, first longitudinal section 12 has been adjusted downwards in a vertical direction to rest against the middle, second section 13. As can be seen from FIGS. 7 and 8, the modified, first guides 20, 21 may be of a length such that in their lowest position they extend down behind the lowest, third longitudinal section 14.

As stated above, the purpose of lowering the uppermost longitudinal section 12 may be, for example, to improve access to a component fitted to the vehicle frame, to permit adjustment of the side underrun protection when adding or modifying vehicle superstructures, or to reinforce the side underrun protection at a predefined height under certain conditions. By having the guides 20, 21 extend down behind the third longitudinal section 14, these can help to absorb lateral forces in the event of a deformation of said section.

Figure 9:
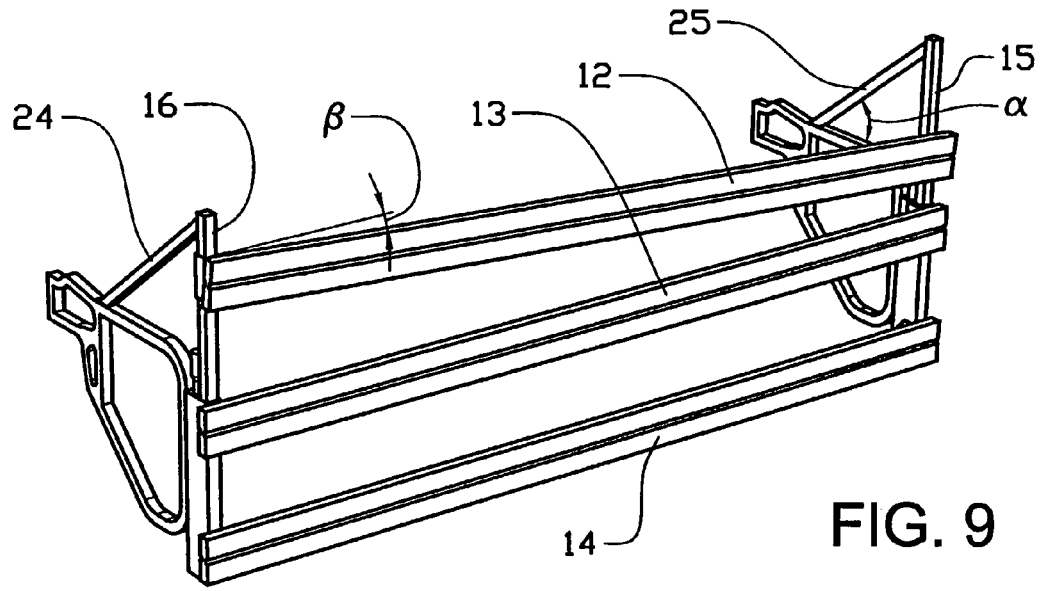
FIG. 9 shows a perspective view of a third embodiment of a side underrun protection according to the invention, with all sections in their active positions.
Figure 10:
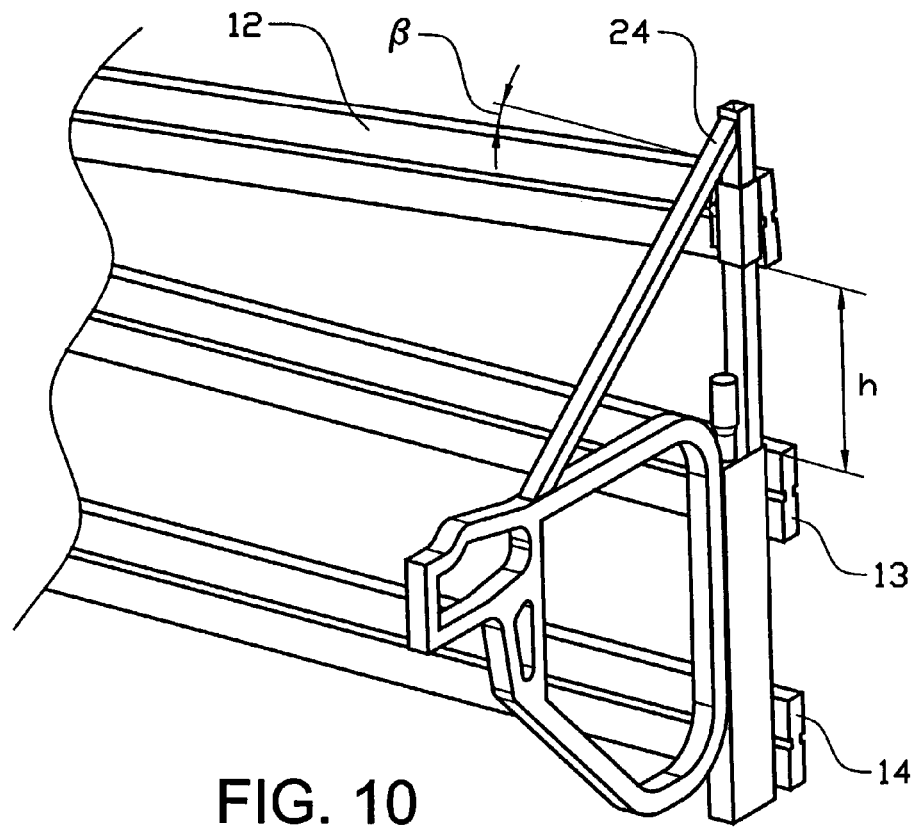
FIG. 10 shows a detailed view of the side underrun protection shown in FIG. 9.

FIG. 9 shows a further alternative embodiment of a side underrun protection according to FIG. 1. According to this embodiment the vertical first guides 15, 16 have been provided with force-absorbing braces 24, 25. These braces 24, 25 run from the upper ends of each guide 15, 16 diagonally downwards to an upper part of the tubular construction of the frame part 8, 9. These braces are fitted at an angle a, preferably of less than 45° to the horizontal plane. The angle is suitably chosen having regard to the calculated loading case for the upper longitudinal section 12. The figure also shows how at least the upper longitudinal section 12 can be angled in relation to the horizontal plane. Depending on the intended function, it is possible to lower either end of said section 12 in relation to the section 13 immediately below and to adjust it to an angle β in relation to the horizontal plane. The opposite end can naturally at the same time be set to the desired height h in relation to the said section 13 below.

Figure 11:
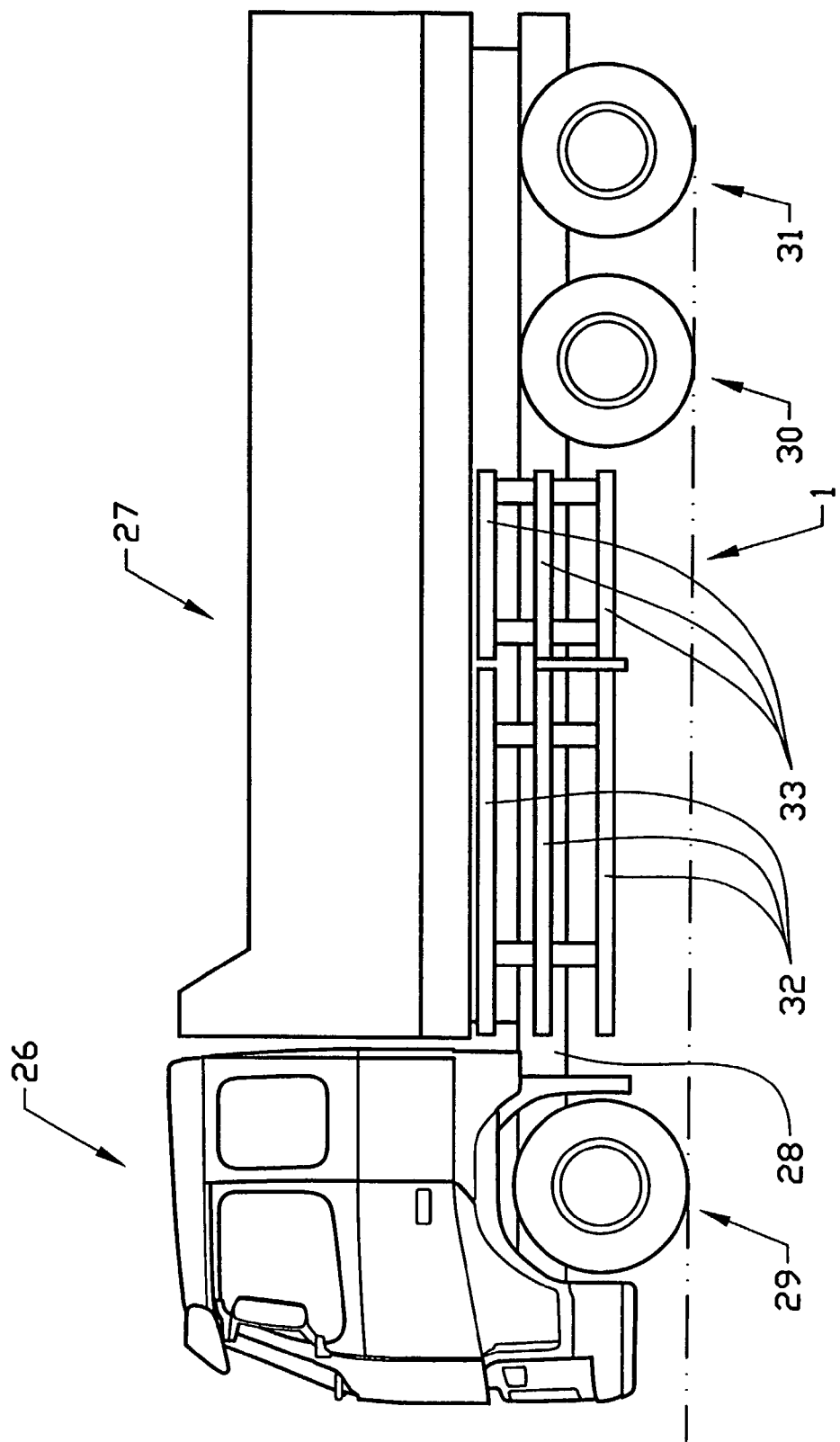
FIG. 11 shows a vehicle provided with a side underrun protection according to the invention.

FIG. 11 shows a vehicle in the form of a truck 1 having a driver's cab 26 and a tipping body 27 provided with a side underrun protection 1 according to the invention. In this case the side underrun protection is mounted on the frame 28 between the front wheel 29 of the truck and the front wheel 30 of a pair of rear wheels 30, 31. In this case the side underrun protection comprises a first protection having a number of first longitudinal sections 32 and a second protection having a number of second longitudinal sections 33, which are located basically in the same plane as the outer tire sides of the adjacent wheels 29, 30. The respective sections 32, 33 of the side underrun protections can be adjusted as described for the embodiments in FIGS. 1 to 10 above.

The invention is not limited to the embodiments described above but can be applied to all types of structural elements that can be manufactured by means of the method described above. For example, all embodiments described with reference to FIGS. 1 to 8 may be provided with one or more longitudinal sections that can be angled. Nor are the embodiments above limited to the vehicle shown in FIG. 11, the embodiments being adaptable to any type of truck which needs to be provided with some form of side underrun protection.

What is claimed is:

1. An arrangement for a vehicle side underrun protection comprising:

at least one load-bearing member extendable between wheels of the vehicle in the longitudinal direction thereof and substantially along an outer contour of the vehicle, said at least one load-bearing member adapted to serve as side impact protection to prevent unprotected road-users from accidentally entering under the vehicle; and at least two longitudinal sections positioned one above the other by means of telescoping guides and suspended in at least two brackets fixable to the vehicle and along which at least one end of one of said at least two longitudinal sections of the side underrun protection is vertically adjustable relative to the corresponding end or ends of the other or others of said at least two longitudinal sections.

2. The arrangement as recited in claim 1, wherein both ends of said one longitudinal section are vertically adjustable relative to the corresponding end or ends of the other or others of said at least two longitudinal sections.

3. The arrangement as recited in claim 1, wherein at least one of said longitudinal sections is moveably fastened to at least one of said brackets adjacent front or a rear end thereof.

4. The arrangement as recited in claim 1, wherein at least one of said longitudinal sections is moveably fastened to each of said brackets adjacent front and rear ends thereof.

5. The arrangement as claimed in claim 1, wherein one of said longitudinal sections is moveably fastened to another of said longitudinal sections adjacent to front and rear ends thereof.

6. The arrangement as recited in claim 1, wherein one of said one longitudinal sections is moveably fastened to a another of said longitudinal sections by a pair of vertical guides.

7. The arrangement as recited in claim 1, wherein at least one of said longitudinal sections is horizontally adjustable in relation to a first active position thereof.

8. The arrangement as recited in claim 1, wherein said brackets are fixed to a longitudinal member in the vehicle.

9. A vehicle including a side underrun protection arrangement comprising:

a vehicle having a body supported on a plurality of wheels;

at least one load-bearing member extending between at least a pair of said plurality of wheels of the vehicle in the longitudinal direction of the vehicle and substantially along an outer contour of the vehicle, said at least one load-bearing member serving as side impact protection to prevent other vehicles from accidentally entering under the vehicle; and at least two longitudinal sections positioned above each other by means of telescoping guides and suspended by at least two brackets fixed to the vehicle and along which brackets at least one end of each of said longitudinal sections is vertically adjustable relative to the corresponding end or ends of the other or others of said longitudinal sections.

* * * * *